Figure 5:
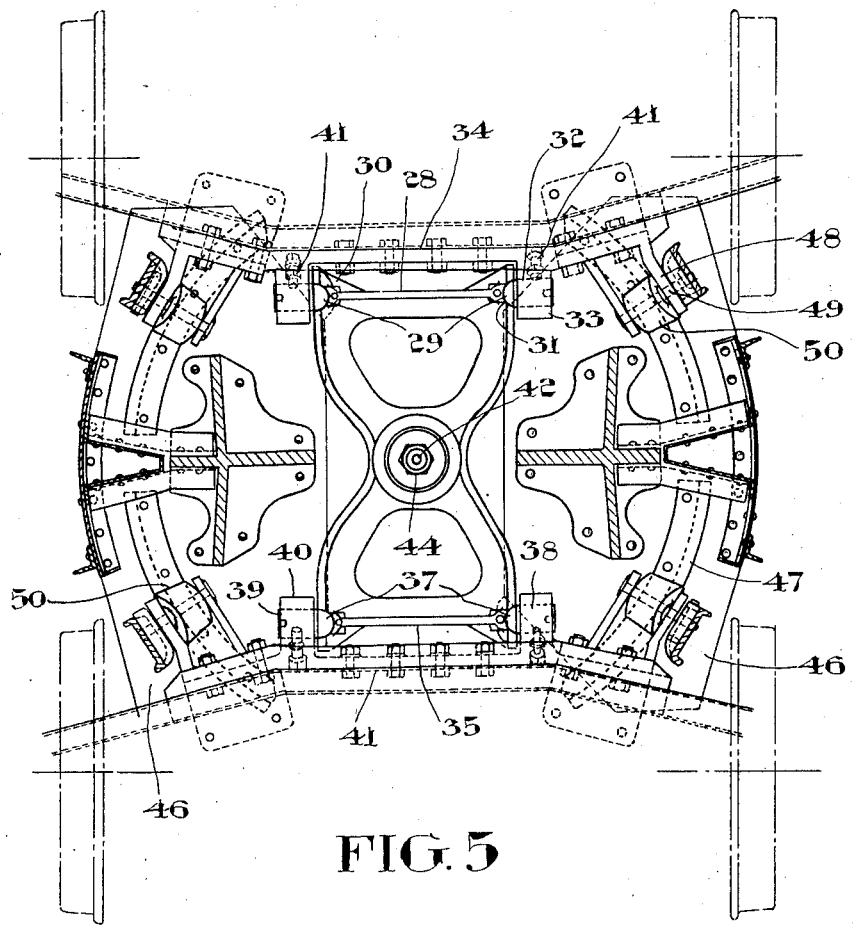

Oct. 29, 1929.        E. R. VIBERG        1,733,705
                      ARTICULATED CAR
              Filed May 23, 1928        2 Sheets-Sheet 1
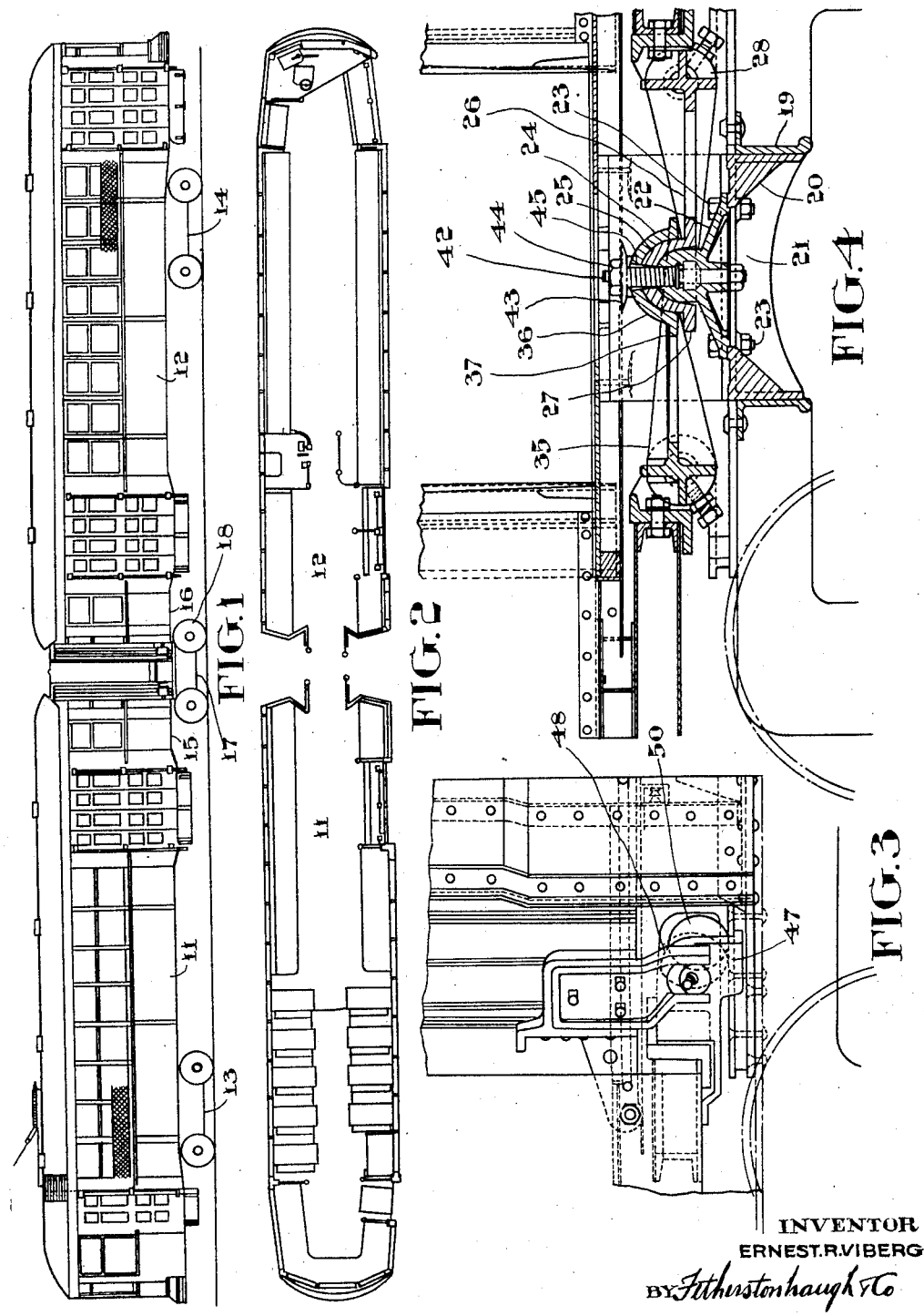
INVENTOR
ERNEST.R.VIBERG
BY Fetherstonhaugh & Co
ATTORNEYS Oct. 29, 1929.　　　E. R. VIBERG　　　1,733,705
ARTICULATED CAR
Filed May 23, 1928　　2 Sheets-Sheet 2

INVENTOR
ERNEST. R. VIBERG
BY Featherstonhaugh & Co
ATTORNEYS

Patented Oct. 29, 1929

1,733,705

UNITED STATES PATENT OFFICE

ERNEST R. VIBERG, OF MONTREAL, QUEBEC, CANADA

ARTICULATED CAR

Application filed May 23, 1928. Serial No. 280,026.

This invention relates to new and useful improvements in articulated cars and particularly to the connections between the adjacent ends of the car sections and the bogies. The object of the invention is to provide connections between the car sections and the body which will reduce the strain on said sections to a minimum when taking vertical or horizontal curves.

Another object is to provide connections between the central truck and the car sections which will eliminate jolting and which will allow independent turning and swivelling movement between the sections.

According to my invention I provide an articulated car comprising two car sections mounted on three bogies, one at each end and one at the centre. The ends of the sections are provided with end bearings which support rollers resting on roller paths secured to the upper part of the centre truck. Secured to the centre truck is a semi-spherical bearing which receives the ends of the connecting members which are so constructed that the twisting of the car bodies between the sections is reduced to a minimum. The ends of the sections are connected to the truck in a rigid manner, but are so pivoted that the sections can move independent of one another, while turning curves, so that the twisting strain on the sections is practically eliminated.

In the drawings which illustrate one form of my invention:—Figure 1 is a side elevation of an articulated car showing the truck positions diagrammatically. Figure 2 is a plan view of the car shown in Figure 1. Figure 3 is a side elevation of one end of one of the car sections showing the roller supporting means. Figure 4 is a part sectional side elevation of the truck bearing and the connecting members between the said truck and the car sections. Figure 5 is a plan showing part of one of the connecting members, the truck runway and one of the supporting rollers resting on the runway.

Referring more particularly to the drawings, 11 designates one section of an articulated car and 12 another section. The opposite ends of the car rest on the trucks 13 and 14, which may be of any standard type. The adjacent ends 15 and 16 of the sections are supported on a truck 17. The wheels 18 of truck 17 may be resiliently mounted in the frame in any suitable manner, not shown. Only parts of the truck 17 which are related to the connecting and supporting means are shown in detail. The truck 17 has a transom 19 which, for illustrative purposes only, is shown comprising a pair of bulb angles extending from side to side of the truck. Secured to the said angles is the support 20 which is provided with a central opening 21 to receive and position the semi-spherical bearing 22. The bearing 22 is secured to the support by the bolts 23. The semi-spherical portion 24 projects above the base of the bearing and resting thereon is the end 25 of the connecting member 26, said end being of semi-spherical shell form with the outside surface concentric with the inner surface. A circular flange 27 surrounds the lower portion of the shell. The other end 28 of the connecting member extends transversely of the truck and each side 30 is provided with a recess 29. The recesses are semi-spherical to receive the rounded ends 31 of the pins 32 passing through bearings 33 secured to the end sills 34 of one section of the car. A connecting member 35 extends between the other section of the car and the semi-spherical portion 24. The end 36 of the said member 35 is of semi-spherical shell form and rests on the portion 24. This end 36 is provided with a flange 37.

The other end of the member 35 extends transversely of the truck and is provided with recesses 37 to receive the rounded ends 38 of the pins 39 passing through the bearing 40 secured to the end sill 41 of the adjacent car section. The pins 32 and 39 are held in place by means of the locking set screws 41 passing through the bearings. Passing through the semi-spherical portions of the connecting member and the bearing is the bolt 42, and spring washers 43 are placed at the upper end of the bolt to resiliently hold the said portions together. The tension of the washers 43 is regulated by adjusting a nut 44. The aperture 45 in the portions through which the bolts pass are preferably tapered to allow relative movement between the connections. Mounted on the upper surface 46 of the truck and radially disposed to the center of the semi-spherical bearing mounted thereon are the roller races 47. These races have a flat top surface, and the rollers are tapered with broken faces undercut forming a lock between bracket 48 and the races, thereby providing a rigid connection for both car bodies and central connection when rounding curves. In other words, with the two sections locked to the side bearing races, the truck will absorb the twisting strains through the springs and relieve the bodies. As the relative rotative movement between the truck and the adjacent ends of the car sections is due to said cars having to go round small curves, the races must be made of sufficient length so that the rollers will not disengage the races when on sharp curves. It is not necessary, however, that the races be made continuous. Secured to the ends of the car sections are the bearings 48 and rotatably mounted on pins 49 passing through the bearings are the rollers 50. The rollers rest on the runway.

The parts shown are illustrated as regards detail and it will be readily understood that modifications may be made thereto without departing from the spirit of the invention.

In operation it will be seen that the connecting members form a universal connection between the sections, as well as a connection between the sections and the truck. The semi-spherical bearing portions and connections to the section ends allow the sections to move independently in the vertical and horizontal directions while the car is in motion, the sections being supported on the truck and movable therewith. The connecting members form a rigid connection which will eliminate twisting of the car bodies when starting and stopping. The semi-spherical connections and the roller supports reduce the strain of the ends of the sections to a minimum as the sections move independently and follow the movement of the adjacent ends of the truck.

Having thus described my invention, what I claim is:—

1. In articulated car construction, a plurality of car sections, a truck positioned between the sections, connecting members between the truck and each of the sections, each end of each of the connecting members having semi-spherical bearings forming universal connections with the truck and the adjacent section.

2. In articulated car construction, a plurality of car sections, a truck positioned between the sections, a sectional roller race on the truck, rollers secured to the sections and resting on the roller race, a rigid connecting member between each section and the truck, said connecting members having knuckle bearing connections at each end to allow independent rotative and vertical movement between the truck and the sections.

3. In articulated car construction, a plurality of car sections, a truck positioned between the sections, roller supporting means between the sections and the truck, a rigid connecting member between each section and the truck, each arm having semi-spherical bearings at its ends co-acting with semi-spherical projections on the truck and the sections to allow vertical and rotative movement between the truck and the sections.

4. In articulated car construction, a plurality of car sections, a truck positioned midway between the sections, a semi-spherical bearing on the truck, semi-spherical projections on the sections, rigid connecting members having semi-spherical recesses connecting the projections with the bearing, and means secured to the sections and resting on the truck to form a support between them.

5. In articulated car construction, a plurality of car sections, a truck positioned between the sections, roller supporting means between the sections and the bogie, a semi-spherical bearing secured to the truck, pins projecting from the car sections, a rigid connection between the bearing and the pins on one section, and a rigid connection between the pins and resting on a semi-spherical bearing formed on the first mentioned rigid connection.

6. In articulated car construction, a plurality of car sections, a truck positioned between the sections, rollers secured to the end of the sections and resting on raceways on the truck, a semi-spherical bearing secured to the truck, bearings secured to the sections, pins passing through the last mentioned bearings and having rounded ends projecting horizontally from the bearings, a rigid connecting member between the pins on one section and the bearing on the truck, said connection having semi-spherical recesses for engaging with the pins and the truck bearing, a rigid connection between the pins on the other section and a semi-spherical bearing surface formed in the other connecting member and above the centre of the truck.

7. An articulated car according to claim 6 having a bolt passing through the truck and the semi-spherical bearings and recesses in the connecting members, and a resilient washer between the bearing and the bolt head.

8. In articulated car construction, a plurality of car sections, a truck positioned between them, roller races on the truck, undercut section supporting rollers resting on the races and rotatably secured to bearings secured to the adjacent ends of the sections, semi-spherical bearings secured to the truck bearings secured to the sections, pins passing through the last mentioned bearings and having rounded ends projecting horizontally from the bearings, a rigid connecting member between the pins on one section and the bearing on the truck, said member having semi-spherical recesses for engaging with the pins and the truck bearing, a rigid connecting member between the pins and the other section, said last mentioned connection having semi-spherical recesses at one end for the pins and at the other end for resting on the first-mentioned rigid connecting members, and means to resiliently hold the ends of the connecting members and the truck.

In witness whereof, I have hereunto set my hand.

ERNEST R. VIBERG.